US012060529B2

(12) United States Patent
Kiiski et al.

(10) Patent No.: US 12,060,529 B2
(45) Date of Patent: Aug. 13, 2024

(54) MARINE FUEL BLEND

(71) Applicant: Neste Oyj, Espoo (FI)

(72) Inventors: Ulla Kiiski, Porvoo (FI); Merja Kouva, Porvoo (FI); Markku Kuronen, Porvoo (FI); Jenni Nortio, Porvoo (FI)

(73) Assignee: NESTE OYJ, Espoo (FI)

( * ) Notice: Subject to any disclaimer, the term of this patent is extended or adjusted under 35 U.S.C. 154(b) by 334 days.

(21) Appl. No.: 17/297,713

(22) PCT Filed: Nov. 13, 2019

(86) PCT No.: PCT/FI2019/050808
§ 371 (c)(1),
(2) Date: May 27, 2021

(87) PCT Pub. No.: WO2020/109653
PCT Pub. Date: Jun. 4, 2020

(65) Prior Publication Data
US 2022/0033717 A1    Feb. 3, 2022

(30) Foreign Application Priority Data

Nov. 28, 2018  (FI) .................................... 20186007

(51) Int. Cl.
C10G 45/58    (2006.01)
C10L 1/08     (2006.01)

(52) U.S. Cl.
CPC .............. C10G 45/58 (2013.01); C10L 1/08 (2013.01); C10L 2200/0438 (2013.01); C10L 2200/0469 (2013.01); C10L 2270/026 (2013.01)

(58) Field of Classification Search
CPC .............. C10L 1/08; C10L 2200/0438; C10L 2200/0469; C10L 2270/026; C10G 2300/1011; C10G 3/47; C10G 45/58
See application file for complete search history.

(56) References Cited

U.S. PATENT DOCUMENTS

| 9,006,501 B2 | 4/2015 | Brafman et al. |
| 9,458,396 B2 | 10/2016 | Weiss et al. |
| 2011/0126449 A1 | 6/2011 | Xu et al. |
| 2013/0014431 A1 | 1/2013 | Jin et al. |
| 2013/0131360 A1* | 5/2013 | Abhari ............... C10G 3/50 585/16 |
| 2013/0144091 A1 | 6/2013 | Pansare et al. |
| 2014/0291200 A1 | 10/2014 | Weiss et al. |

(Continued)

FOREIGN PATENT DOCUMENTS

| CN | 105778987 B | 8/2017 | |
| CN | 108300572 A | 7/2018 | |
| WO | WO-2015178941 A1 * | 11/2015 | ............... C10L 1/04 |

OTHER PUBLICATIONS

Finnish Office Action for Patent Application No. 20186007 dated Mar. 26, 2019 (7 pages).

(Continued)

Primary Examiner — Latosha Hines
(74) Attorney, Agent, or Firm — Buchanan Ingersoll & Rooney PC

(57) ABSTRACT

A marine fuel blend comprising renewable hydrotreated fuel is disclosed. The present marine fuel blend is environmentally friendly and has good pour point and storage stability.

16 Claims, 2 Drawing Sheets

(56) References Cited

U.S. PATENT DOCUMENTS

2015/0368576 A1* 12/2015 Boonwatsakul .......... C10L 1/14
  44/411
2017/0183575 A1 6/2017 Rubin-pitel et al.
2018/0155647 A1* 6/2018 Robinson ............... C10G 45/08

OTHER PUBLICATIONS

Finnish Search Report for Patent Application No. 20186007 dated Mar. 26, 2019 (2 pages).

International Preliminary Report on Patentability (PCT/IPEA/409) mailed on Feb. 26, 2021, by the European Patent Office as the International Searching Authority for International Application No. PCT/FI2019/050808.

International Search Report (PCT/ISA/210) with translation and Written Opinion (PCT/ISA/237) mailed on Feb. 19, 2020, by the European Patent Office as the International Searching Authority for International Application No. PCT/FI2019/050808.

Caton, P. A., et al., Hydrotreated Algae Renewable Fuel Performance in a Military Diesel Engine. In: Proceedings of the ASME 2012 Internal Combustion Engine Division Spring Technical Conference, May 2012, ICES2012-81048 (12 pages).

Fu, J., et al., "Characteristics and stability of biofuels used as drop-in replacement for NATO marine diesel", Fuel, Sep. 15, 2018, vol. 236, pp. 516-524.

Fu, J., et al., "Characteristics and Stability of Neat and Blended Hydroprocessed Renewable Diesel", Energy & Fuels, May 7, 2014, vol. 28, pp. 3899-3907.

Ghosh, S. K., "Alternative Fuels for Marine Applications", Tennessee Renewable Energy Economic Council, Oct. 2014, [retrieved on Mar. 8, 2019] (29 pages).

Hsieh, P. Y., et al., "Chemical and Thermophysical Characterization of an Algae-Based Hydrotreated Renewable Diesel Fuel", Energy & Fuels, Apr. 8, 2014, vol. 28, pp. 3192-3205.

Mohd Noor, C.W., et al., "Biodiesel as alternative fuel for marine diesel engine applications: A review", Renewable and Sustainable Energy Review, Elseviers Science, New York, NY, US, vol. 94, Jun. 9, 2018, pp. 127-142.

* cited by examiner

MARINE FUEL BLEND

FIELD OF THE INVENTION

The present invention relates to marine fuel blends. The present marine fuel blends composed of marine fuel and renewable hydrotreated fuel, wherein the renewable hydrotreated fuel increases bio content and improves pour point and storage stability.

BACKGROUND

Environmental interests drive fuel producers to use renewable sources in the manufacture of marine fuels. The current trend is toward marine fuels having lower impact on environment, and they should preferably have small impact on green house gases such as carbon dioxide. Low sulphur content would also be advantageous because it is an aim to reduce sulphur emissions particularly in arctic areas. Thus, novel marine fuels are needed to meet requirements set by regulations and consumer needs.

It is an object of the present invention to provide a renewable marine fuel blend with low sulphur content and good pour point. It is another object to provide a marine fuel, which can be used in applications where long-term storage stability is required. Another object is to provide a drop-in type marine fuel with bio content, which can be taken into use with current marine fuel logistics.

SUMMARY

The present inventors have surprisingly found that renewable hydrotreated fuel can be blended with marine fuel to improve its pour point in a synergistic way. The present marine fuel blend is able to achieve and even exceed the requirements of the standard ISO 8217 (2017). Advantageously, the present marine fuel blend has a very low sulphur content, excellent pour point and storage stability. Further, because the renewable hydrotreated fuel of the present invention has 90% smaller greenhouse gas emissions over its life cycle compared to a fossil fuel, the greenhouse gas emissions of the present blend are much lower than those of a fully fossil marine fuel.

According to the first aspect of the invention is provided a marine fuel blend comprising:
  marine fuel having a density between 860 and 960 kg/m$^3$ at 15° C.; and 0.5-50 vol-% renewable hydrotreated fuel;
wherein the marine fuel blend has a pour point which is lower than the calculated pour point expressed as the weighted average of the pour points of the marine fuel and the renewable hydrotreated fuel.

According to the second aspect of the invention is provided a method of manufacturing the marine fuel blend of the first aspect comprising:
  providing marine fuel having a density between 860 and 960 kg/m$^3$ at 15° C.;
  selecting an amount of renewable hydrotreated fuel which provides a higher than calculated improvement of the pour point of the marine fuel blend; and
  blending the marine fuel with the amount of renewable hydrotreated fuel.

According to the third aspect is provided use of the marine fuel blend of the first aspect for decreasing sulphur emissions of a marine vessel.

According to the fourth aspect is provided use of the marine fuel blend of the first aspect for decreasing carbon dioxide footprint of marine traffic.

According to a further aspect of the invention is provided a method of improving pour point of marine fuel by blending a first marine fuel with renewable hydrotreated fuel. Preferably the first marine fuel is DMB type or RMB type quality marine fuel.

According to a further aspect of the invention is provided a method of improving storage stability of marine fuel by blending a first marine fuel with renewable hydrotreated fuel. Preferably the first marine fuel is DMB type or RMB type quality marine fuel.

An advantage of the invention is that with the claimed blend the pour point of marine fuel can be improved in a synergistic way. With the claimed range the renewable fuel improves pour point of the marine fuel to a greater extent than what can be expected based on prior knowledge of such blends, or based on calculated pour point value. Further, the storage stability of the marine fuel blend is also better than what can be achieved by blending with renewable fuels used in prior art.

DETAILED DESCRIPTION OF THE INVENTION

Figure 1:
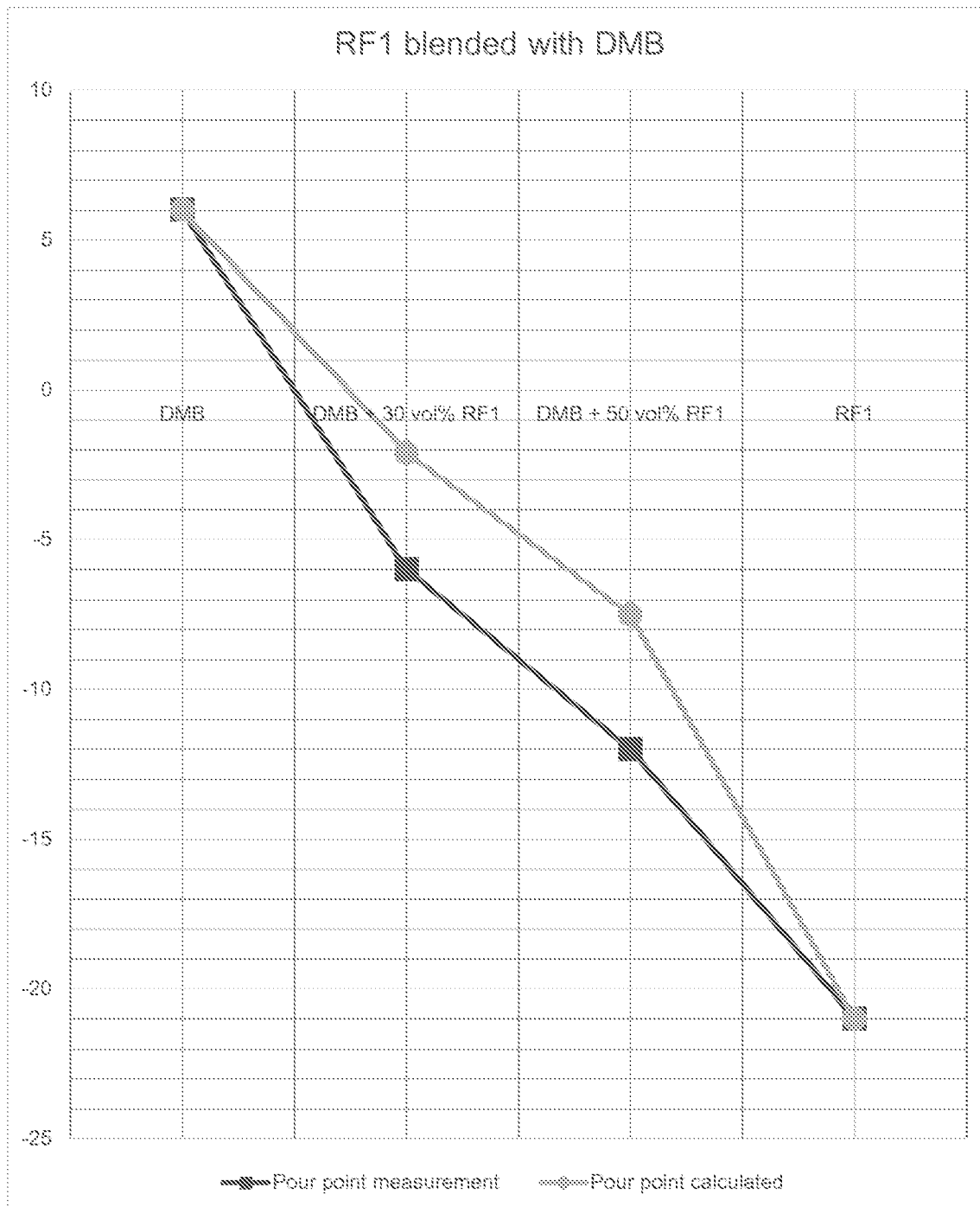
FIG. 1 shows the synergistic improvement (greater decrease) of pour point achieved by blending RF1 (renewable hydrotreated and isomerised fuel) to DMB type of marine fuel.

For marine fuel blends an estimate of the pour point is typically calculated by determining the pour points of the blend components, and then calculating the weighted average of the blend based on the proportion of the blend components.

For example, a blend comprising 70 vol-% component 1 having a pour point of 10° C. and 30 vol-% component 2 having a pour point of 5° C. has a calculated pour point of (70*10° C.+30*5° C.)/100=8.5° C.

However, it is known and also shown in a comparative example below, that the calculated pour point does not give an accurate estimate of the real measured pour point of a blend. The component having a poor (higher) pour point typically prevails over the other component(s) in blends, making it difficult to estimate the actual pour point of a blend. However, it is important to know the pour point of marine fuel blends, because fuel logistics and marine engines require a certain pour point for reliable flow of the fuel. If the real pour point of a blend cannot be reliably estimated based on calculations, there is a risk that the actual pour point of the blend is higher than expected, which potentially results into problems when the blend is used or transported in low temperatures.

Surprisingly, with the presently claimed marine fuel blend the measured pour point of the marine fuel blend is actually lower (i.e. better) than the calculated value. This is particularly advantageous because with the present marine fuel blend it is possible to use the calculated value as a reliable estimate of the blend's pour point, as the actual pour point can be expected to be even better (lower) than the calculated value. Thus, the calculated pour point of the present blend can be taken to be a value which is at least achieved although the actual pour point is much lower, thereby leaving a safety margin between the calculated pour point and the actual pour point of the blend.

In an embodiment the pour point is measured by with method ISO3016 (1994).

Further, the present marine fuel blend has improved storage stability. In the examples below, oxidation stability of the present fuel blend was measured and it was shown to be much better than what can be obtained with blends containing conventional bio diesel.

In an embodiment storage stability is expressed as oxidation stability measured with method EN16091 (2011).

Thus, the present marine fuel blend has properties that make it suitable for use as a marine fuel, and in particular for use where long term storage, arctic conditions, clean combustion, low sulphur emission and low carbon footprints are needed. The present fuel blend is particularly useful for use in life-boats, ice breakers and auxiliary engines.

The vol-% of the renewable hydrotreated fuel is expressed as the vol-% calculated from the total volume of the blend. The remaining volume comprises marine fuel and may optionally comprise other components.

In an embodiment the renewable hydrotreated fuel comprises paraffinic components in the carbon number range $C_{15}$-$C_{18}$, said paraffinic components comprising at least 70 vol-%, more preferably at least 80 vol-%, most preferably at least 90 vol-%, of the renewable hydrotreated fuel.

In an embodiment the renewable hydrotreated fuel contains 1.1% w/w or less aromatics.

In an embodiment the renewable hydrotreated fuel contains less than <0.5% w/w oxygen-containing hydrocarbons. In another embodiment the hydrotreated renewable fuel does not contain oxygen.

In an embodiment the marine fuel has a sulphur content of less than 0.5 wt-%, preferably 0.1 wt-% or less.

In an embodiment the marine fuel blend has a sulphur content 0.5 wt-% or less, preferably 0.1 wt-% or less.

In an embodiment the sulphur content of the marine fuel blend is controlled to 0.5 wt-% or less, preferably to 0.1 wt-% or less, by blending a marine fuel which has a sulphur content above said limit with the renewable hydrotreated fuel. Thus, with the present invention it is possible to achieve not only synergistic improvement in the pour point, but also a sulphur content, which is a technical requirement set to marine fuels to meet SECA (Sulphur Emission Control Area) objectives.

In an embodiment the marine fuel blend has a kinematic viscosity of max 6 cSt at 40° C., density of max 900 kg/m³ and pour point of 6° C. or less. Preferably the marine fuel blend is a DMB type marine fuel In an embodiment the marine fuel blend has a kinematic viscosity of 30 cSt at 50° C., density of max 960 kg/m³ and pour point of 30° C. or less. Preferably the marine fuel blend is a RMB type marine fuel.

In an embodiment the marine fuel blend comprises 0.5-30 vol-% renewable hydrotreated fuel.

In an embodiment the marine fuel blend comprises 0.5-10 vol-% renewable hydrotreated fuel.

In an embodiment the marine fuel blend comprises 0.5-10 wt-%, 0.5-9 wt-%, 0.5-8 wt-%, 0.5-7 wt-%, 0.5-6 wt-%, 0.5-5 wt-%, 1-10 wt-%, 1-9 wt-%, 1-8 wt-%, 1-7 wt-%, 1-6 wt-%, 1-5 wt-%, 2-10 wt-%, 2-9 wt-%, 2-8 wt-%, 2-7 wt-%, 2-6 wt-%, or 2-5 wt-% renewable hydrotreated fuel.

In an embodiment the marine fuel blend comprises 5-50 wt-%, 5-40 wt-%, 5-30 wt-%, 5-20 wt-%, or 5-10 wt-% renewable hydrotreated fuel.

In an embodiment the pour point of the marine fuel blend is at least about 4, about 4.5, about 7.5, or about 10.5° C. lower than the calculated pour point of the blend. In a preferred embodiment the marine fuel is DMB, which is shown in the Figures to provide the largest improvement (i.e. lowering) of the pour point of the blend.

In a particularly preferred embodiment the marine fuel is DMB and the renewable hydrotreated fuel is isomerised, which provides a blend with a pour point which is at least about 3°, such as about 3, about 3.5, about 4, about 4.5 or about 5° C. lower than the calculated pour point of the blend. In another embodiment the blend has a pour point which is about 4-4.5° C. lower than the calculated pour point of the blend.

In another particularly preferable embodiment the marine fuel is DMB and the renewable hydrotreated fuel is not isomerised, which provides a blend with a pour point which is at least about 7° C., such as about 7, about 7.5, about 8, about 8.5, about 9, about 9.5, about 10, about 10.5, or about 11° C. lower than the calculated pour point of the blend. In another embodiment the blend has a pour point which is about 7.5-10.5° C. lower than the calculated pour point of the blend.

In a preferred embodiment the marine fuel is RMB and the pour point of the marine fuel blend is at least about 4.5° C., such as about 4.5, about 5, about 5.5, or about 6° C. lower than the calculated pour point of the blend. In a preferred embodiment the renewable hydrotreated fuel is not isomerised, which is shown in the example below to provide a particularly effective improvement in the pour point of the blend. The skilled person is able to use the teaching of the invention and blend the RMB and the renewable hydrotreated fuel which is not isomerised and measure its pour point. Thus, the skilled person is able to achieve a blend which has a pour point which is different from the one obtained in the example below. Typically in blends the component which has the highest (worse) pour point dominates, and the effect of the component having a lower (better) pour point is not fully achieved in the blend. Consequently, the actual pour point of the blend is typically worse (higher) than the calculated pour point. However, with the present embodiment a larger than calculated improvement (i.e. decrease) of the pour point of the blend was achieved.

In an embodiment the difference between the pour point of the marine fuel and the pour point of the renewable hydrotreated fuel is at least 3° C., such as 3, 4, 5, 6, 7, 8, 9, 10, 11, 12, 13, 14, 15, 16, 17, 18, 19, 20, 21, 22, 23, 24, 25, 26, 27, 38, 29 or 30° C., In a preferred embodiment the marine fuel is DMB, the renewable hydrotreated fuel is isomerised, and the difference between the pour point of the marine fuel and the pour point of the renewable hydrotreated fuel is about 27° C., This embodiment can be used to obtain an improvement of at least 3° C. in the pour point of the blend, such as about 3.5, about, 4 or about 4.5° C.

In a preferred embodiment the marine fuel is DMB and the renewable hydrotreated fuel is not isomerised, and the difference between the pour point of the marine fuel, and the pour point of the renewable hydrotreated fuel, is about 15° C., Such components can be used in the blend to obtain an improvement of at least 7° C. in the pour point of the blend, such as about 7.5, about 8, about 9, about 10, or about 10.5° C.

In a preferred embodiment the marine fuel is RMB and the renewable hydrotreated fuel is not isomerised, and the difference between the pour point of the marine fuel, and the pour point of the renewable hydrotreated fuel, is about 3° C., Such components can be used in the blend to obtain an improvement of about 5° C. in the pour point of the blend.

In an embodiment the amount of renewable hydrotreated fuel is selected such that the marine fuel blend has a pour point which is lower than the calculated pour point expressed as the weighted average of the pour points of the marine fuel and the renewable hydrotreated fuel. This amount can be selected easily by following the teachings of the Examples below, i.e. by blending the renewable hydrotreated fuel with the marine fuel, and measuring and calculating the pour points of the prepared blends. When these results are plotted in a graph as shown in the attached Figures, the range of synergistic improvement in pour point can easily be recognised.

Thus, by selecting the marine fuel and the renewable hydrotreated fuel as explained above, an unexpected, i.e. much higher than calculated, improvement of pour point of the resulting blend can be achieved. An improvement in this context refers to a lower pour point, which is advantageous for the present invention which aims at providing marine fuel blends for use in low and/or changing temperatures. When manufacturing blends according to the present invention the skilled person is able to obtain blends that have slightly different pour points than reported below in the examples. The skilled person understands that marine fuels comply with standards that allow some fluctuation in e.g. pour point, density etc. Thus, the present invention is not limited to the blends prepared in the examples only, but the invention can be generalised to embodiments described herein. By using the teaching of the present application, the skilled person is able to manufacture marine fuel blends that have a pour point which is e.g. 1-3° C. different from the measured pour points reported below in the examples.

The present inventors found that typically in marine fuel blends the component which has the highest (worse) pour point dominates, and the effect of the component having a lower (better) pour point is not fully achieved in the blend. Consequently, the actual pour point of the blend is typically lower than the calculated pour point, which makes it difficult to prepare marine fuel blends that have at least a certain pour point. However, with the present invention a larger than calculated improvement (i.e. decrease) of the pour point of the blend was achieved, which makes it possible to prepare marine fuel blends that have at least a certain pour point.

For practical reasons, in certain embodiments or examples of the present invention a wt-% unit is used instead of a vol-% unit when defining an amount of the fuel blend components. However, the present invention is equally applicable and achieves its technical effects whichever unit is used to define the invention. For example an amount of an analyte present in the blend such as sulphur, oxygen-containing hydrocarbon or an aromatic compound is practical to express as wt-%.

In an embodiment the marine fuel complies with ISO 8217: 2017.

DMB refers to distilled marine bunker or distilled marine fuel. RMB refers to residual type marine bunker or residual marine fuel. Both DMB and RMB type marine fuels comply with the standard ISO8217:2017.

In an embodiment the marine fuel has a sulphur content of 0.5 wt-% or less.

In an embodiment the marine fuel has a sulphur content of 0.1 wt-% or less.

In an embodiment the marine fuel blend has a sulphur content of 0.5 wt-% or less.

In an embodiment the marine fuel blend has a sulphur content of 0.1 wt-% or less.

In an embodiment the marine fuel is DMB type distillate marine fuel, and the marine fuel blend is DMA type distillate marine fuel according to ISO8217:2017. Thus, the renewable hydrotreated fuel is used to improve the quality of the marine fuel.

In an embodiment the marine fuel blend comprises 25-50 vol-% renewable hydrotreated and isomerised fuel. As the Examples show, this range is particularly useful to obtain a strong synergistic effect in the pour point and storage stability. In another embodiment the marine fuel blend is of DMB type and comprises 30-50 vol-% renewable hydrotreated fuel.

In an embodiment the marine fuel blend comprises 0.5-10 vol-% renewable hydrotreated fuel, which is not isomerised. This range is particularly useful to obtain a strong synergistic effect in pour point and storage stability. In another embodiment the fuel blend is of DMB type and comprises 1-50 vol-% renewable hydrotreated fuel, which is not isomerised.

In an embodiment the marine fuel blend is of RMB type and comprises 0.5-50 wt-% renewable hydrotreated fuel, which is not isomerised. This range is particularly useful to obtain a strong synergistic effect in the pour point and storage stability.

In an embodiment in the present method an amount of renewable hydrotreated fuel is selected which provides an improvement of at least 3° C., preferably at least 5° C. in the measured pour point of the marine fuel blend compared to the calculated pour point. Such an amount is useful in manufacturing marine fuel blends where improvement of pour point is desired. As the present marine fuel blend provides a synergistic improvement in the pour point, a smaller amount of the renewable hydrotreated fuel is needed to achieve the desired pour point, resulting into an economical advantage.

When preparing the renewable hydrotreated fuel, in the first step of the process fatty acids, triglycerides and other fatty acid derivatives comprised in the feed are deoxygenated, denitrogenated and desuplhurisated by hydrotreatment. Hydrotreating includes at least hydrodeoxygenation (HDO) and decarboxylation/decarbonylation, i.e. removal of oxygen in the form of CON, as well as other catalytic processes to remove oxygen from organic oxygen compounds in the form of water, to remove sulphur from organic sulphur compounds in the form of dihydrogen sulphide ($H_2S$), to remove nitrogen from organic nitrogen compounds in the form of ammonia ($NH_3$) and to remove hydrodenitrogenation (HDN) and halogens, for example chlorine from organic chloride compounds in the form of hydrochloric acid (HCl) and hydrodechlorination (HDCl).

In the hydrotreating step, the pressure range may be varied, or is selected from the range between 20 and 150 bar, preferably between 50 and 100 bar, and the temperature is selected from the range between 200 and 400° C., preferably between 250 and 350° C. and most preferably between 280 and 340° C.

In the hydrotreatment/hydrodeoxygenation step, known hydrogenation catalysts containing metals from Group VIII and/or VIB of the Periodic System may be used. Preferably, the hydrogenation catalysts are supported Pd, Pt, Ni, NiMo or a CoMo catalyst, the support being alumina and/or silica. Typically, $NiMo/Al_2O_3$ and $CoMo/Al_2O_3$ catalysts are used.

The hydrotreating is optionally followed by isomerisation, such as hydroisomerisation, where branches on the hydrocarbon backbone are formed and i-paraffins are produced. Typically methyl and ethyl side-chains are formed in the isomerisation step and the degree of isomerisation, e.g. the amount of methyl branches formed and their distance from each other, can be controlled by reaction conditions, such as temperature and catalyst. Isomerisation produces an improved performance for the product for low temperatures.

In the isomerisation step, the pressure varies in, or is selected from, a range of 20-150 bar, preferably in the range of 30-100 bar and the temperature varies, or is selected from, a range between 200 and 500° C., preferably between 280 and 400° C.

In the isomerisation step, an isomerisation catalyst known in the art may be used. Suitable isomerisation catalysts contain a molecular sieve and/or metal selected from Group VIII of the Periodic Table and/or carrier. Preferably, the isomerisation catalyst contains SAPO-11 or SAPO-41 or ZSM-22 or ZSM-23 or ferrierite and Pt, Pd, or Ni and $Al_2O_3$ or $SiO_2$. Typical isomerisation catalysts are, for example, PUSAPO-11/$Al_2O_3$, PUZSM-22/$Al_2O_3$, PUZSM-23/$Al_2O_3$ and Pt/SAPO-11/$SiO_2$.

In an embodiment the hydrotreating step and the isomerisation step are carried out separately in a two-step process. In an embodiment the hydrotreatment catalyst(s) and the isomerisation catalyst(s) are not in contact with the feed at the same time.

In an embodiment the renewable hydrotreated fuel feedstock comprises hydrotreated, and optionally isomerised, vegetable oil (HVO), and/or wood and/or other plant based oil, animal fat, fish fat, fish oil, algae oil, microbial oil or combination thereof, and optionally recyclable waste and/or residue, or a combination thereof.

Recyclable waste comprises material such as used cooking oil, free fatty acids, palm oil by-products or process side streams, sludge, and side streams from vegetable oil processing.

The renewable hydrotreated fuel feedstock may comprise:
one or more free fatty acid distillates, such as palm fatty acid distillate and/or soya free fatty acid distillate;
one or more free fatty acid containing bio based feedstock, such as crude and refined palm based oil, technical corn oil, tall oil, seed oil, animal fat, waste cooking oil, jatropha curcas oil, fish oil, microbial oil, and/or algae oil;
by-products from fatty acid methyl ester and bio based chemicals production and/or oil derived from lignocellulosic biomass; and/or
one or more lower molecular weight acids containing bio based feedstock such as pyrolysis oil and/or sludge palm oil.

In one embodiment in the renewable hydrotreated fuel the amount of the paraffinic component in the range of carbon number $C_{15}$-$C_{18}$ is at least 70 wt-%, more preferably more than 80 wt-%, most preferably more than 90 wt-%. This distribution is characteristic for paraffinic renewable fuels differentiating it from fossil fuels, and is advantageous because there are no easily volatile light paraffinic components. Further, such a renewable hydrotreated fuel was shown in the Examples to provide a much higher than calculated improvement in the pour point when used in the marine fuel blends.

Carbon atoms of renewable origin comprise a higher number of $^{14}C$ isotopes compared to carbon atoms of fossil origin. Therefore, it is possible to distinguish the hydrocarbons of renewable origin (such as the renewable hydrotreated fuel) from non-renewable hydrocarbons (such as the marine fuel) by analysing the amount of $^{14}C$ isotopes. The amount of a renewable fuel in a blend can be determined according to ASTM D6866 (2018). In an embodiment the determination is carried out using the analysis of biobased content of natural range materials by liquid scintillation spectrometry according to method A or method C based on $^{14}C$ dating.

Optionally, in the renewable hydrotreated fuel the amount of the paraffinic components in the range of carbon number $C_3$-$C_{14}$ is less than 25 wt-%, such as less than 20 wt-%, less than 10% wt-%, or less than 7 wt-%. Further, optionally in the renewable hydrotreated fuel the amount of the paraffinic components in the range of carbon number $C_{19}$-$C_{24}$ is less than 25 wt-%, such as less than 20 wt-%, less than 10 wt-%, or less than 5 wt-%. The above distribution of paraffinic components is typical for the renewable hydrotreated fuel of the present invention. The flash point is determined with the amount of the light paraffinic components and sooting is minimized with the amount of heavier components.

It is further possible to blend the renewable hydrotreated fuel in a desired amount with aromatic hydrocarbons, naphthenic hydrocarbons, a fossil fuel, and/or FAME. However, preferably the marine fuel does not contain FAME, or its amount is kept very low, to achieve good long-term storage stability which results from oxidation of FAME.

In an embodiment the renewable hydrotreated fuel complies with EN 15940:2016 for paraffinic diesel fuels.

In an embodiment the marine fuel blend does not contain further cold flow additive(s).

EXAMPLES

The following examples are provided to illustrate various aspects of the present invention. They are not intended to limit the invention, which is defined by the accompanying claims.

Figure 2:
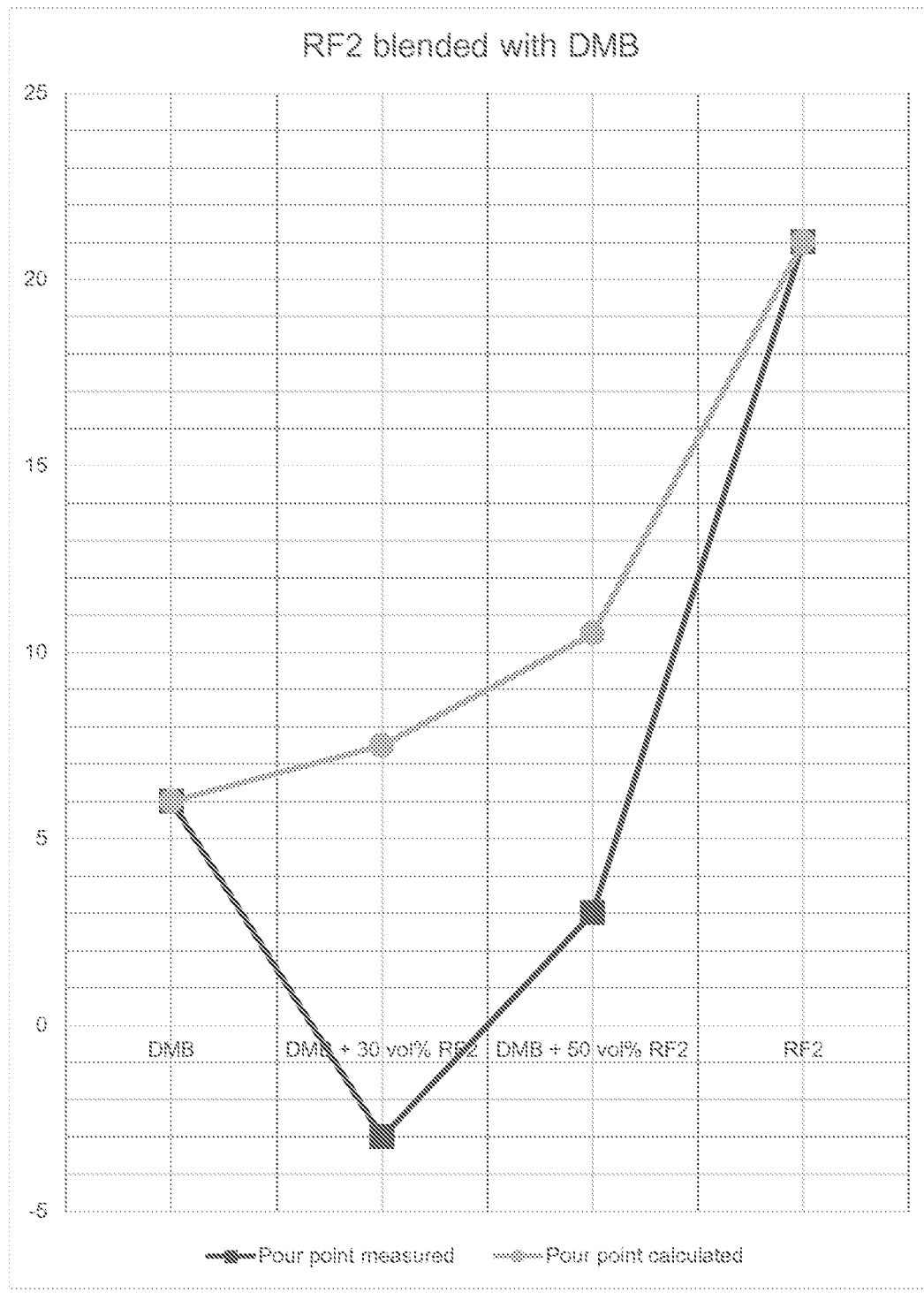
FIG. 2 shows the synergistic improvement (decrease) of blending RF2 (renewable hydrotreated fuel without isomerisation) to DMB type of marine fuel.

Renewable hydrotreated isomerised fuel (RF1) and renewable hydrotreated diesel without isomerisation (RF2) were blended with DMB and RMB type products. By blending 30 vol-% or 50 vol-% of RF1 in DMB product the measured pour point values are ca. 4° C. better than linearly calculated values (Table 1 and FIG. 1). By blending 10 vol-% or 30 vol-% of RF2 in DMB product measured pour point results were up to 10.5° C. better than calculated values. Surprisingly the pour points of the blends were better than those of individual components (Table 2 and FIG. 2). Generally the poorest component with a higher pour point value is dominating in the blends. The surprising improvement of pour point in the blend of the present invention gives economic benefit in fuel blending in refineries by alleviating the poorer component effect.

Additionally 30 vol-% of both RF1 and RF2 in DMB show better oxidation stability than calculated linearly from the component values (Table 3). On the contrary 7% FAME blend has poorer oxidation stability than expected.

Pour point was measured with method ISO3016 (1994) and oxidation stability was measured with method EN16091 (2011).

Table 4 shows that pour point benefit of 5.1° C. is achieved by blending 30 vol-% RF2 with RMB type fuel.

In a comparative example a blend of 7 vol-% FAME in DMB was used, and the measured pour point of the blend was 6° C. DMB has a measured pour point of 6° C., and FAME has a measured pour point of −12° C., resulting into a calculated pour point of 4.74° C. for the 7 vol-% FAME blend in DMB. This comparative example shows that FAME could not improve the pour point of the blend at all, and the "worse" pour point of DMB dominated in the blend.

TABLE 1

RF1 blended with DMB

| Fuel | Pour point (measured) °C. | Pour point (calculated) °C. | Difference °C. |
|---|---|---|---|
| DMB | 6 | — | — |
| DMB + 30 vol-% RF1 | −6 | −2.1 | −3.9 |
| DMB + 50 vol-% RF1 | −12 | −7.5 | −4.5 |
| RF1 | −21 | −21 | — |

TABLE 2

RF2 blended with DMB

| Fuel | Pour point (measured) °C. | Pour point (calculated) °C. | Difference °C. |
|---|---|---|---|
| DMB | 6 | — | — |
| DMB + 10 vol-% RF2 | −3 | 7.5 | −10.5 |
| DMB + 30 vol-% RF2 | 3 | 10.5 | −7.5 |
| RF2 | 21 | — | — |

TABLE 3

Oxidation stability results.

| Fuel | Oxidation stability, min (measured) | Oxidation stability, min (calculated) | Difference, min |
|---|---|---|---|
| DMB | 149.98 | — | — |
| RF1 | 74.42 | — | — |
| RF2 | 186.61 | — | — |
| FAME | 29.17 | — | — |
| DMB + 30 vol-% RF1 | 191.74 | 127.31 | 64.4 |
| DMB + 30 vol-% RF2 | 183.72 | 160.97 | 22.8 |
| DMB + 7% FAME | 107.21 | 141.52 | −34.3 |

TABLE 4

RF1 and RF2 blended with RMB type fuel

| Fuel | Pour point (measured) °C. | Pour point (calculated) °C. | Difference, °C. |
|---|---|---|---|
| RMB | 24 | — | — |
| RMB + 30 vol-% RF1 | 18 | 10.5 | +7.5 |
| RMB + 30 vol-% RF2 | 18 | 23.1 | −5.1 |
| RF1 | −21 | — | — |
| RF2 | 21 | — | — |

Different non-binding example aspects and embodiments of the present invention have been illustrated in the foregoing. The embodiments are used merely to explain selected aspects or steps that may be utilized when implementing the present invention. Some embodiments may be presented herein only with a reference to a certain aspect of the invention. It should be appreciated that the embodiments may apply to other aspects of the present invention, as well. Consequently, any appropriate combination of the embodiments and the aspects may be formed. Any combination of aspects or embodiments as disclosed herein may also be made without at least one non-essential feature disclosed in an aspect or embodiment.

The invention claimed is:

1. A marine fuel blend comprising:
   a DMB type or RMB type marine fuel having a density between 860 and 960 kg/m$^3$ at 15° C.; and
   the marine fuel blend also having 0.5-50 vol-% of a renewable hydrotreated fuel, wherein the renewable hydrotreated fuel includes paraffinic components in a carbon number range $C_{15}$-$C_{18}$, said paraffinic components constituting at least 70 vol-% of the renewable hydrotreated fuel; and
   wherein the marine fuel blend has a pour point which is at least 3° C. lower than a calculated pour point expressed as a weighted average of pour points of the marine fuel and the renewable hydrotreated fuel; and
   wherein the marine fuel blend has an oxidation stability which is higher than a calculated oxidation stability expressed as a weighted average of oxidation stability values of the marine fuel and the renewable hydrotreated fuel, and wherein the oxidation stability is calculated as defined in EN16091 (2011).

2. The marine fuel blend of claim 1, wherein the renewable hydrotreated fuel comprises:
   paraffinic components in a carbon number range $C_{15}$-$C_{18}$, said paraffinic components constituting at least 80 vol-% of the renewable hydrotreated fuel.

3. The marine fuel blend of claim 1, having a sulphur content of 0.5 wt-% or less.

4. The marine fuel blend of claim 1, having a kinematic viscosity of max 6 cSt at 40° C., density of max 900 kg/m$^3$ and a pour point of 6° C. or less, and being a DMB type marine fuel.

5. The marine fuel blend of claim 1, having kinematic viscosity of max 30 cSt at 50° C., density of max 960 kg/m$^3$ and pour point of 30° C. or less, and being a RMB type marine fuel.

6. The marine fuel blend of claim 1, comprising:
   0.5-30 vol-% renewable hydrotreated fuel.

7. The marine fuel blend of claim 1, wherein the renewable hydrotreated fuel comprises:
   paraffinic components in a carbon number range $C_{15}$-$C_{18}$, said paraffinic components constituting at least 90 vol-% of the renewable hydrotreated fuel.

8. The marine fuel blend of claim 1, having a sulphur content of 0.1 wt-% or less.

9. The marine fuel blend of claim 1, comprising:
   0.5-10 vol-% renewable hydrotreated fuel.

10. The marine fuel blend of claim 1, having a kinematic viscosity of max 6 cSt at 40° C., density of max 900 kg/m$^3$ and a pour point of 6° C. or less.

11. The marine fuel blend of claim 1, having kinematic viscosity of max 30 cSt at 50° C., density of max 960 kg/m$^3$ and pour point of 30° C. or less.

12. The marine fuel blend of claim 1, wherein the renewable hydrotreated fuel is comprised of a hydrotreated vegetable oil, a hydrotreated wood, a hydrotreated plant-based oil, a hydrotreated animal fat, a hydrotreated fish fat, a hydrotreated fish oil, a hydrotreated algae oil, a hydrotreated microbial oil, or a combination thereof.

13. The marine fuel blend of claim 1, wherein there is between 30 vol-% and 50 vol-% of the renewable hydrotreated fuel in the marine fuel blend.

14. The marine fuel blend of claim 1, wherein there is between 5 wt % and 30 wt % of the renewable hydrotreated fuel in the marine fuel blend.

15. The marine fuel blend of claim 1, wherein there the marine fuel blend does not contain any cold flow additives.

16. The marine fuel blend of claim 15, wherein the renewable hydrotreated fuel is comprised of a hydrotreated vegetable oil, a hydrotreated wood, a hydrotreated plant-based oil, a hydrotreated animal fat, a hydrotreated fish fat, a hydrotreated fish oil, a hydrotreated algae oil, a hydrotreated microbial oil, or a combination thereof.

* * * * *